United States Patent [19]
Okuyama et al.

[11] Patent Number: 5,793,723
[45] Date of Patent: Aug. 11, 1998

[54] METHOD AND A SYSTEM FOR ADJUSTING OPTICAL RECORDING DEVICE INVOLVING AN OPTICAL RECORDING MEDIUM OF NON-UNIFORM HEAT CHARACTERISTICS

[75] Inventors: Toshihiro Okuyama, Yokosuka; Haruhisa Iida, Yokohama; Satomi Yoshibe, Kawasaki, all of Japan

[73] Assignee: Nikon Corporation, Tokyo, Japan

[21] Appl. No.: 663,384

[22] Filed: Jun. 13, 1996

[30] Foreign Application Priority Data

| Jun. 14, 1995 | [JP] | Japan | 7-147174 |
| Aug. 9, 1995 | [JP] | Japan | 7-203026 |
| Aug. 15, 1995 | [JP] | Japan | 7-208031 |

[51] Int. Cl.⁶ ............................................. G11B 7/00
[52] U.S. Cl. ........................ 369/54; 369/13; 369/116; 369/275.3
[58] Field of Search ........................ 369/124, 116, 369/13, 275.1, 275.3, 275.2, 275.4, 54, 60

[56] References Cited

U.S. PATENT DOCUMENTS

| 5,182,734 | 1/1993 | Watanabe et al. | 369/13 |
| 5,513,165 | 4/1996 | Ide et al. | 369/13 |
| 5,590,111 | 12/1996 | Kirino et al. | 369/116 |

*Primary Examiner*—Nabil Hindi
*Attorney, Agent, or Firm*—Woodcock Washburn Kurtz Mackiewicz & Norris LLP

[57] ABSTRACT

The discrepancies in the input-output operations associated with utilizing predetermined optical disk portions with various heat capacities to store data are substantially reduced by providing additional and separate information to compensate the non-uniform characteristics. The additional data may be stored in an external memory or on the disk itself.

45 Claims, 9 Drawing Sheets

METHOD AND A SYSTEM FOR ADJUSTING OPTICAL RECORDING DEVICE INVOLVING AN OPTICAL RECORDING MEDIUM OF NON-UNIFORM HEAT CHARACTERISTICS

FIELD OF THE INVENTION

The current invention is generally related to a method and a system for fine-tuning input-output (I/O) operations involving an optical disk, and more particularly related to a method and a system for optimizing I/O operations on an optical disk that stores data in both land and groove portions.

BACKGROUND OF THE INVENTION

An optical disk system generally includes at least an optical disk medium, a laser light source and an input-output (I/O) controller unit. The optical disk medium stores information by changing the surface characteristics for the incident laser light so that the reflected light can be converted into electrical signals corresponding to the stored information. The optical disk system also includes an optical pick up unit and a servo device for moving the pick up unit over the disk surface. The I/O controller unit coordinates the activation and the deactivation of the above described components.

Figure 1:
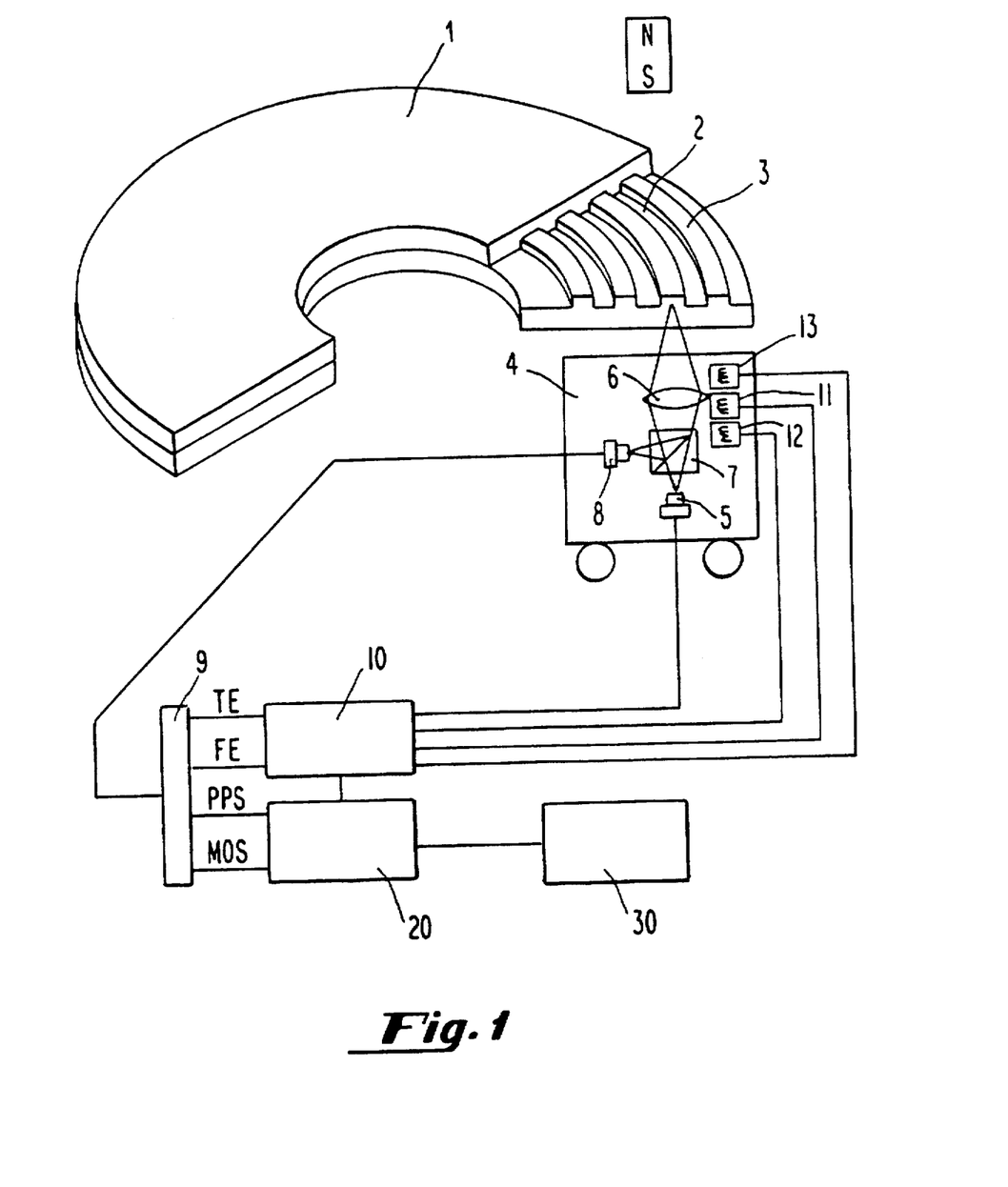
FIG. 1 diagrammatically illustrates a conventional optical storage system.

Referring to FIG. 1, certain components of an optical system are diagrammatically illustrated with a partially crossectional and expanded perspective view of an optical disk. The components include an optical disk 1, an optical pick-up unit 4, a servo controller 10, and a system input-output controller 20. The optical pick-up unit 4 further includes the laser source unit 5 for emitting a laser beam towards the optical disk 1 via a beam splitter 7 and an object lens 6. In order to focus the laser beam, a focus actuator 13 positions the object lens 6 along the direction of the laser beam at a predetermined distance with respect to the laser light source 5. The focused laser beam is moved over the surface of the optical disk 1 along the radius of the disk 1 by a positioner 12 so that the beam approaches towards a desired track. Furthermore, a track actuator precisely positions the focused beam on the specified track. A servo controller 10 controls the above described servo mechanisms 11, 12 and 13.

Still referring to FIG. 1, the focused laser beam incident upon a track is reflected back towards the optical pick-up unit 4. The reflected laser beam is diverted from the original beam axis by the beam splitter 7 towards an optical detector 8 for generating an electrical signal. The detected electrical signal is sent to a processing circuit 9 for further processing. The processing circuit 9 generates a focus error signal (FE) as well as a track error signal (TE) as necessary and sends these signals to the servo controller 10 for compensating the detected positional errors. The processing circuit 9 also generates a pit positional signal (PPS) for indicating the position of the track and a magnetoptical signal (MOS) for representing the stored data at the position. The circuit 9 sends these signals to the I/O system controller 20 for further input-output operations with a host computer 30. The host computer 30 receives the data stored in the magnetoptical disk as well as sends data to be stored in the disk at the specified addresses.

Still referring to FIG. 1, read-write optical disks are generally optical in nature and include magnetoptical disks and phase change optical disks. These disks are constructed to have predetermined data storage areas such as a land portion 3 and a groove portion 2 as shown in FIG. 1. In general, the land and groove portions are adjacently located spiral tracks and have a pitch ranging from approximately 1.0 µm to approximately 1.8 µm. In general, these two areas are constructed in such a way that the groove portion 2 is projecting towards and located closer to the laser source unit 5 than the land portion 3.

Figure 2:
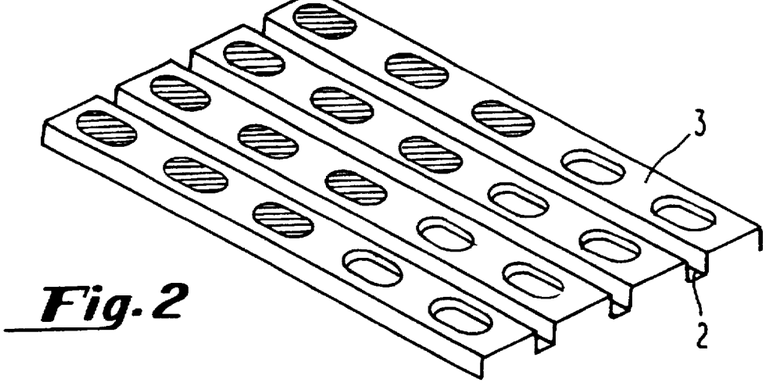
FIG. 2 illustrates marks stored on a groove portion of a conventional optical disk.

Now referring to FIG. 2, the land portions 3 and the groove portions 2 are illustrated in a perspective view. In the past, either the land portion 3 or the groove portion 2 is used for storing data. In this example, the land portion 3 is used as a track for storing data while the groove portion 2 does not store data and is used for guiding the laser beam on the track. The reversed arrangement is also possible. In order to increase the memory capacity of the optical disk, in one type of prior attempts, the pitch of the tracks was decreased so that more tracks are defined per unit area. However, such thin tracks having a pitch of less than 1.4 µm caused a cross talk problem since a diameter of the focused laser beam was larger than a single track width and extended over the adjacent tracks. Consequently, the adjacent tracks interfered the reflection of the laser beam. In addition, the servo mechanism was prone to have more errors due to the increased requirement for accuracy in guiding the laser beam on narrower tracks. Although a laser source unit was modified to emit laser of a narrower wave length, such a laser source unit was more expensive and also lacked a sufficient emitting power.

Figure 3:
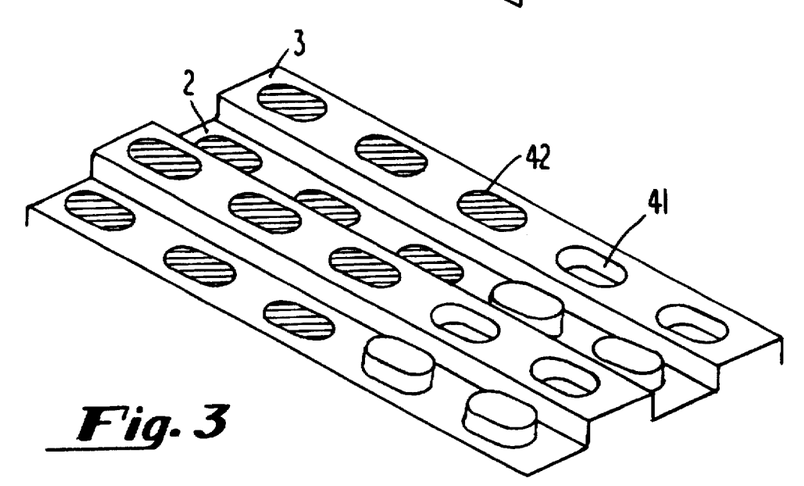
FIG. 3 illustrates marks stored on a groove portion as well as a land portion of a conventional optical disk.

In another approach in the prior attempts to increase the storage capacity of the optical disk, data was stored in both the land portion 3 and the groove portion 2 as shown in FIG. 3. The width of the land portion 3 was constructed to be substantially the same as that of the groove portion 2 so as to read and record the data at an equivalent accuracy level. For example, the width of either track is made at 0.7 µm with the pitch of 1.4 µm. Additionally, in order to reduce the cross talk problem, the depth of the groove portion 2 is adjusted so that the reflected laser beam from the adjacent tracks are not at the same intensity. As a result, when the reflected beam is converted into an electrical signal, the interference from the adjacent tracks is reduced. Despite the groove depth adjustment, when data was stored in both the land and groove portions, the same input-output (I/O) operations produced undesirably different results between the land portions and the groove portions. For example, the accuracy of data retrieval operations from the land portion is substantially different from that from the groove portion.

To lay a foundation for the understanding of the above described discrepancies, the common principle of the optical I/O operations involves heating of the disk medium at predetermined temperatures and is referred to as a heat mode recording. To achieve the predetermined temperatures for recording, retrieving and erasing data on the optical disk, the strength of a laser beam is accordingly adjusted. At the recording strength, the penetrating laser beam generates sufficient energy in a recording layer of the optical disk to cause a certain phase shift, fusion or a change in an axis of magnetization. These changes are referred to as a mark and signifies the recorded data. On the other hand, at the reading strength, the reflected laser beam should be strong enough to differentiate the marks from the non-marks so that a desirable carrier to noise ratio is ascertained. However, the reading laser strength should not change any marks. Lastly, the erasing laser strength should be somewhat stronger than the recording strength so that the existing marks are erased. During the erasing operation, the polarity of an external magnet 16 is reversed from the polarity shown in FIG. 1 when a magnetooptical disk is used.

To meet the above described predetermined heat requirements for the I/O operations, there are at least three variables that need to be taken into account in setting the laser strength. Firstly, the material composition of the magnetoptical disk varies from manufacturers to manufacturers. In this regard, referring to FIG. 4, a cross sectional view of one example of a magnetooptical disk 1 shows a substrate portion 60 which is approximately 130 mm in diameter and made of photo polymer. Over the substrate portion 60, a recording layer 66 and a lower protective layer 64 are spattered. The recording layer 66 is approximately 50 nm thick and made of TbFeCo while the lower protective layer 64 is approximately 70 nm thick and made of SiN. Of course, a different composition of the layer materials generally possesses to a different heat characteristic or heat capacity. The heat capacity of the layer composition should be taken into consideration to determine the laser strength during the optical disk I/O operations.

Secondly, as the laser beam is positioned on the optical disk surface to raise the temperature for performing a certain I/O operation, the disk is rotated at a constant angular speed. However, because of the circular shape of the disk, between a peripheral region and a central region of the disk, the equivalent linear speed is different. Due to the different linear speed, a unit area in the peripheral and central regions receives a different amount of heat energy from the identical laser beam. Consequently, the laser beam at the same strength does not generate the same amount of heat in the peripheral region and the central region. Thus, the locality in the disk must be also considered to determine the laser strength for I/O operations on an optical disk. In order to compensate for the above described factor in determining the laser strength, according to prior art attempts, the laser power table is generated and stored in an external memory or on the same disk. Based upon the position of a specified track and an I/O operation to be performed, a stored value is selected to determine the laser strength.

Lastly, the environmental temperature also affects the laser strength for the optical disk I/O operations. The higher the room temperature, the less energy from the laser beam is needed to achieve a predetermined temperature in a certain disk layer.

In view of the above described factors and other factors for the heat recording mode, in using the high-density optical disk which stores data in both the land and groove portions, the accuracy of the I/O operations remains to be improved.

SUMMARY OF THE INVENTION

To solve the above and other problems, according to one aspect of the current invention, a method of fine-tuning input-output (I/O) operations involving an optical disk medium, includes the following steps of: a) storing information related to heat-characteristics of predetermined recordable portions of the optical disk medium; b) retrieving the information stored in the step a) for a selected one portion of the predetermined recordable portions; and c) adjusting an operational parameter based upon the information retrieved in the step b) so as to substantially improve the I/O operations involving the selected one portion of the optical disk medium.

According to a second aspect of the current invention, a method of adjusting input-output (I/O) operations involving an optical disk having a land portion and a groove portion, includes the following steps of: a) storing separate heat-characteristic information for the groove portion and the land portion in combination with each of the I/O operations on the optical disk; b) determining a portion is wheter the land portion or the groove portion; c)selecting a combination of one of the portions and one of the I/O operations; d) retrieving the information stored in the step b) which corresponds to the combination selected in the step c); and e) adjusting an operational parameter based upon the information retrieved in the step d) so as to substantially optimize the selected I/O operation involving the selected portion of the magnetoptical disk.

According to a third aspect of the current invention, an optical disk includes: recordable data portions for storing data, the data portions having various heat characteristics; and information storage portions each associated with a corresponding one of the data portions for storing separate heat characteristic information.

According to a fourth aspect of the current invention, an optical disk includes: a land portion having a first heat characteristics for storing data; a groove portion located adjacent to the land portion having a second heat characteristics for storing data; and wherein a first table of adjustment values for compensating the first heat characteristics is stored on the land portion while a second table of adjustment values for compensating the second heat characteristics is stored on the groove portion.

According to a fifth aspect of the current invention, a system for adjusting an input-output (I/O) operational parameter for an optical recording device, includes: an optical disk medium having predetermined recordable portions each having various heat characteristics; an adjustable laser source unit for emitting laser which ultimately reaches the optical disk medium; and an I/O controller unit connected to the adjustable laser source unit for modifying the I/O parameter which specifies the strength of the laser based upon the heat characteristics.

According to a sixth aspect of the current invention, a system for adjusting an input-output (I/O) operational parameter for an optical recording device, incudes: an optical disk having predetermined portions including a land portion and a groove portion for recording data, the land portion having a first heat characteristic, the groove portion having a second heat characteristics, separate information for compensating the first heat characteristics and the second heat characteristics in combination with each of the I/O operations being stored in the optical disk; an I/O device for performing a selected I/O operation on a selected portion, the I/O device having an input including an operational parameter; and an I/O controller unit connected to the I/O device for modifying the operational parameter based upon the separate information so as to substantially optimize the selected I/O operation on the selected portion of the optical disk.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 5:
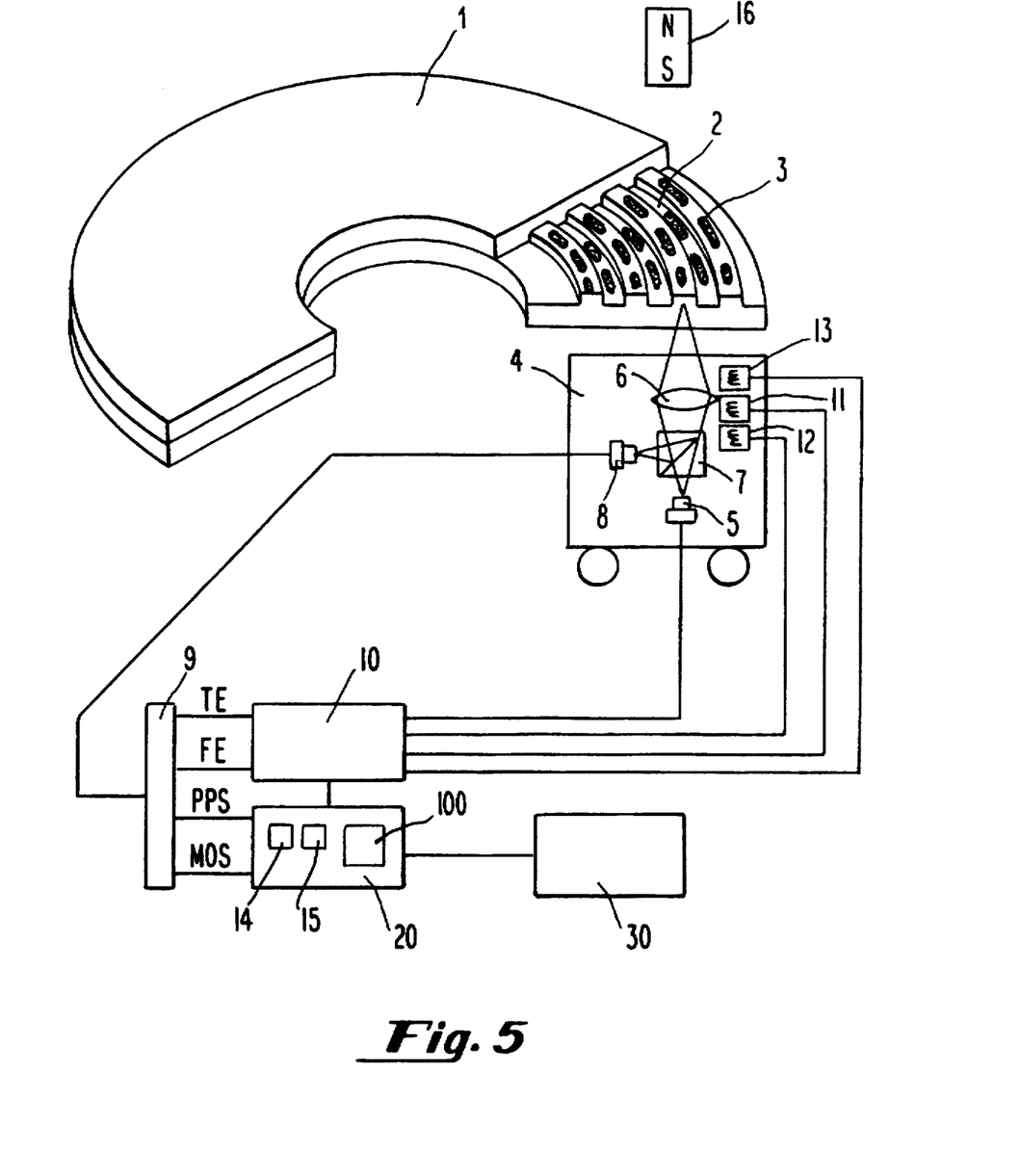
FIG. 5 diagrammatically illustrates an optical storage system according to the current invention.

Referring now to the drawings, wherein like reference numerals designate corresponding structure throughout the views, and referring in particular to FIG. 5, an optical disk storage system according to the current invention is generally similar to the one as described in FIG. 1 in the Background section, and the descriptions of the identical components are not reiterated here. The optical disk 1 now contain data on both the land portion 3 and the groove portion 2. The marks are shown as dark dots or bands on these tracks. As described in the Background section, when both the land and groove portions are used to store data, I/O operations are not as accurately performed as those when only one of the portions is used for the data storage. The I/O performance accuracy is maintained when either of the portions is used at a time for data storage. However, when the land and groove portions are used at the same time, the same laser power table cannot be used for the two portions. According to one preferred embodiment, two separate laser power tables 14 and 15 are provided in the I/O system controller 20 according to the current invention. The power table 14 contains adjustment values for adjusting the laser strength used during I/O operations on the land portion. Similarly, the power table 15 contains separate adjustment vales for adjusting the laser strength used during I/O operations on the groove portion.

In addition to the above described preferred embodiment of the current invention, the same inventive concept is implemented in a variety of other embodiments. According to an alternative embodiment, the power tables 14 and 15 are merged into one table with two entries that contain separate laser power adjustment values respectively for the land and groove portions for a given I/O operation. According to a third embodiment of the current invention, a single table contains a set of adjustment values for the land portion and another set of coefficients for deriving a second set of adjustment values for the groove portion. Additionally, although in the above described first preferred embodiment, the optical disk medium has two separate data storage portions, namely the land portion and the groove portion, the current invention is practiced with more than two predetermined data storage areas of varying characteristics. These characteristics include heat characteristics including heat capacity and heat conductivity of the recording layer as well as an expected amplitude of a given I/O signal, a mark width, a track width, and so on. Furthermore, some of these adjustment values are used for adjusting a gain in a wave form equalizer 100 for predetermined portions of the electrically converted optical signals.

The above described varying characteristics are counter intuitive in view of the fact that the groove portion and the land portion are made from the same disk medium and the spattering process applies the same material. However, when the spattering process is applied to the surface of the disk medium, the surface compositions are assumed to be spattered unequally over the land portion and the groove portion. Because of the projection of the groove portion located adjacent to the land portion and the angle of the spattering is not perfectly parallel to the projection, the projection stands in the way to prevent some composition material from reaching certain areas of the disk surface. Consequently, not only the thickness of the layered composition but also the width of the spattered area appear to be different between the land portion and the groove portion. Thus, the above described separate sets of adjustment values are necessary to modify the laser strength to compensate for the unequal heat characteristics so that a given I/O operation performs substantially the same over the land and groove portions.

Figure 6:
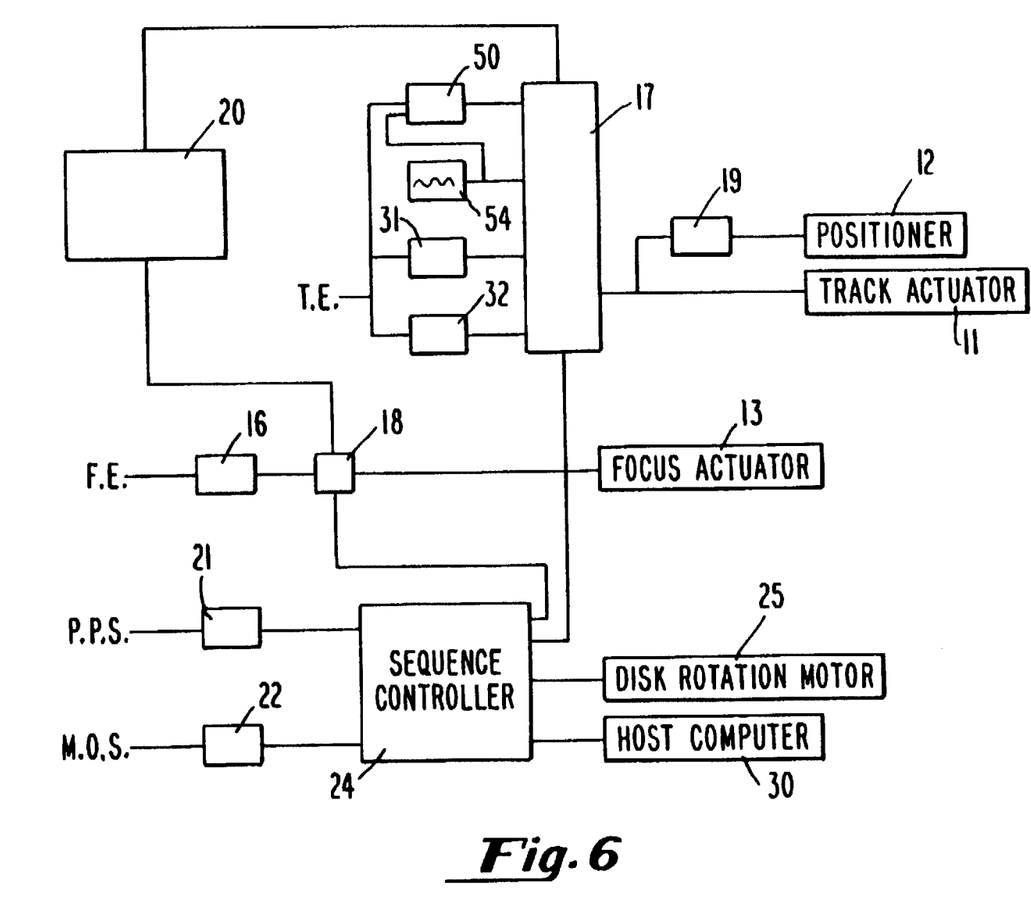
FIG. 6 diagrammatically illustrates some details of a servo controller as well as a land-groove determination unit according to the current invention.

Now referring to FIG. 6, the servo control mechanism and the land-groove detection unit are diagrammatically illustrated. A tracking error (T.E.) signal is inputted into a land track control circuit 31 and a groove control circuit 32, and the output from the respective circuits 31 and 32 is inputted into a first switching circuit 17. In addition, the first switching circuit 17 receives a controller output signal from a system controller 20, a polarity output signal from a tracking polarity detecting circuit 50 as well as an output from a track actuator forcing circuit 54. The combination of the polarity output signal and the controller signal determines the closing and opening of the first switch 17. The first switching circuit output 17 controls a track actuator 11 as well as a positioner 12 via a positioner control circuit 19. On the other hand, the focus error signal (F.E.) controls a focus actuator 13 via a focus control circuit 16 and a second switching circuit 18. The second switching circuit 18 receives a controller output from the system controller 20 and a sequence controller output from a sequence controller 24. The combination of the controller output and the sequence controller output determines the closing and the opening of the second switching circuit. The pit position signal (P.P.S.) is fed into an addressing circuit 21 to determine an address, and the output address is input the sequence controller 24. Lastly, the magnetoptical signal (M.O.S.) is inputted into an information generation circuit 22, and the output is also inputted into the sequence controller unit 24. The sequence controller unit 24 in turn controls a disk rotation motor 102 or interacts with a host computer 30.

Figure 7:
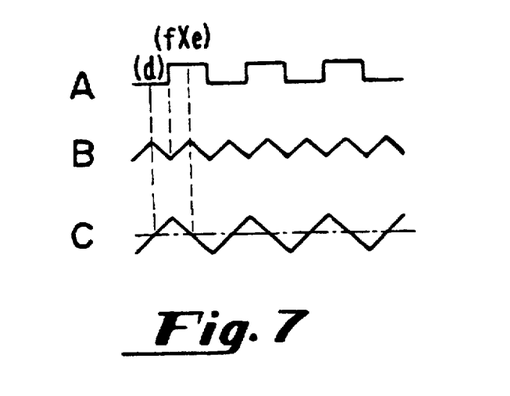
FIG. 7A-C illustrate a polarity change in a tracking error signal used in a determining unit according to the current invention.

Referring to FIGS. 7A–C, in order to determine a type of the track upon which a currently specified I/O operation is performed, a polarity change in the error tracking signal is used according to one preferred embodiment of the current invention. In FIG. 7A, the X axis shows the movement an optical pickup unit along the radius of a magnetoptical disk having land portions and track portions. The Y axis in FIG. 7A shows that at a first level designated by (d) indicates the track is a land portion while at a second level designated by (e) indicates the track is a groove portion. The point (f) is a transition point between the land portion (d) and the groove portion (e). FIG. 7B shows a change in reflection of the laser beam corresponding to the location indicated in FIG. 7A. FIG. 7C shows a tracking error signal which is generated based upon the push-pull method. The positive polarity of the tracking error signal indicates land tracking while the negative polarity indicates groove tracking.

Figure 8:
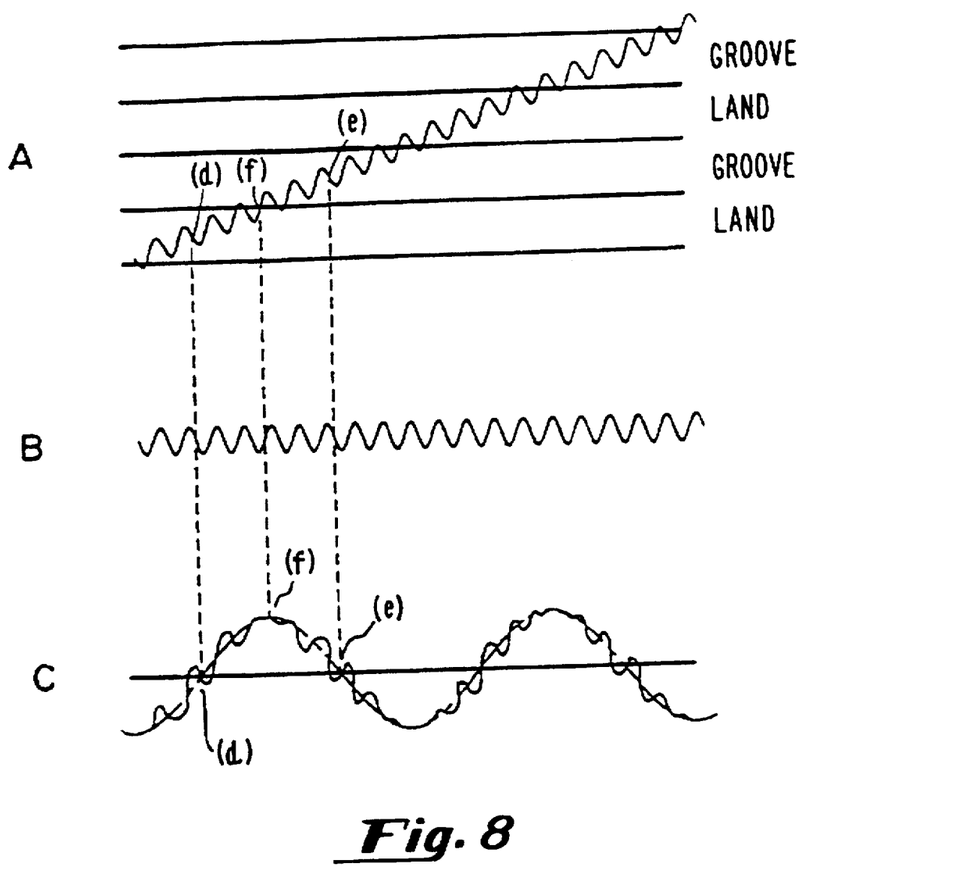
FIGS. 8A-C illustrate how the polarity change in the tracking error signal is used to make a land-groove determination according to the current invention.

Now referring to FIGS. 8A–C, based upon the polarity of the tracking error signal, it can be determined whether an optical pick up unit is on a land portion or on a groove portion. FIG. 8A shows that the optical pick up unit moves along the radius of an optical disk having land portions and groove portions while the disk is rotated at a predetermined speed. As a result, the optical pick up path is a spiral crossing the land portions and the groove portions at a predetermined angle. At a point (d), the optical pick up is on a land track while at a point (e), it is on a groove track. At a point (f), the optical pick up is crossing from the land track into the groove track. FIG. 8B shows a track actuator current. FIG. 8C shows a tracking error signal which is generated by a push-pull method. Between points (d) and (f), the polarity of the tracking error signal is positive with respect to the track actuator current. In contrast, between points (f) and (e), the polarity of the tracking error signal is negative with respect to the track actuator current. Because these polarity corresponds to the position of the optical pick up unit with respect to the above described land and groove portions of the optical disk, the type of the track is detected. Based upon the detected type, the I/O process is performed with improved accuracy by adjusting the laser beam according to a selected adjustment value.

Figure 9:
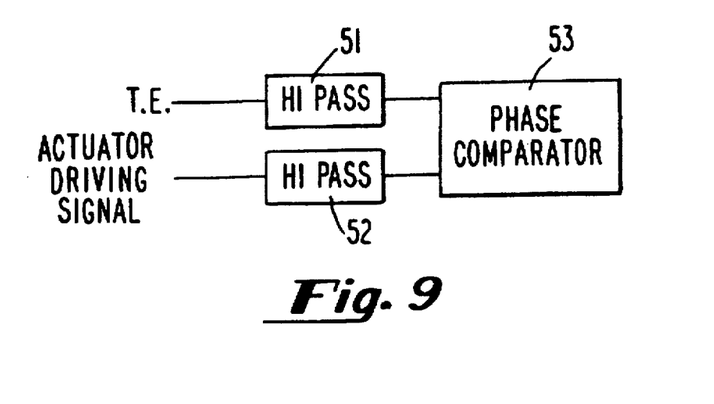
FIG. 9 diagrammatically illustrates one preferred embodiment of the circuit of a land-groove determination unit according to the current invention.

Referring to FIG. 9, according to one preferred embodiment of the current invention, the above described process of detection or determination is implemented in a detection circuit. A tracking error signal and an actuator driving signal are respectively inputted into hi-pass filters 51 and 52 of a predetermined threshold, and the phase of the outputs of the hi-pass filters 51 and 52 are compared by a phase comparator 53. The phase comparator outputs a positive signal when the phase of the two input signals matches while it outputs a negative signal when the phase fails to match. As described above, based upon the polarity of the phase comparator output, the circuit as described in FIG. 9 determines whether the track is a land portion or a groove portion.

In addition to the above described detection or determination process, a track can be determined to be a land portion or a groove portion according to alternative embodiments of the current invention. For example, based upon the pit position signal, a predetermined table has been prepared to have a corresponding position signal value with an entry indicating the type of the track specified by the pit position signal. In another alternative embodiment according to the current invention includes a process to determine the type of the track based upon the address which may be decoded by the pit position or specified by a host computer. Rather than storing types in a table, the type is mathematically determined by a predetermined calculating method such as MOD with a constant.

Figure 10:
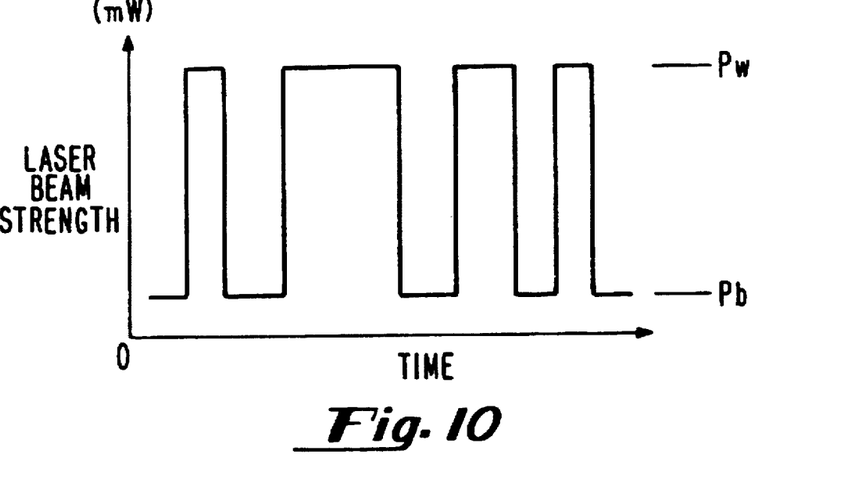
FIG. 10 is a conceptual graph illustrating how long the laser beam is casted on the optical disk medium based upon the laser power table according to the current invention.

Once the detection or determination of the type of the track is made, the corresponding adjustment value or other correction information is retrieved for the specified portion of the optical disk, and a parameter such as an I/O function parameter value is accordingly modified prior to the execution of the I/O operation. For example, in order to record some data on a particular groove portion, an optical recording unit is moved towards the specified groove track and a servo mechanism tracks the movement. When the head reaches the specified groove track, the tracking servo is turned off and the track address is generated based upon the tracked data. If the generated track address fails to match the specified address, the servo tracking process is repeated until the addresses match. If the specified address on the disk already contains some data, the data is first erased by beaming the specified track by emitting the laser at 1.2 times the optimal groove laser strength. An external magnet is reversed if a magnetooptical disk is used. Referring to FIG. 10, after it is confirmed that the optical pick up unit is positioned to a specified groove track, Pw is adjusted to 0.9 times of the optimal laser beam strength for recording on the groove portion while Pb is set to be 0.1 times the same optimal value. [please explain what Pw and Pb mean]

Figure 4:
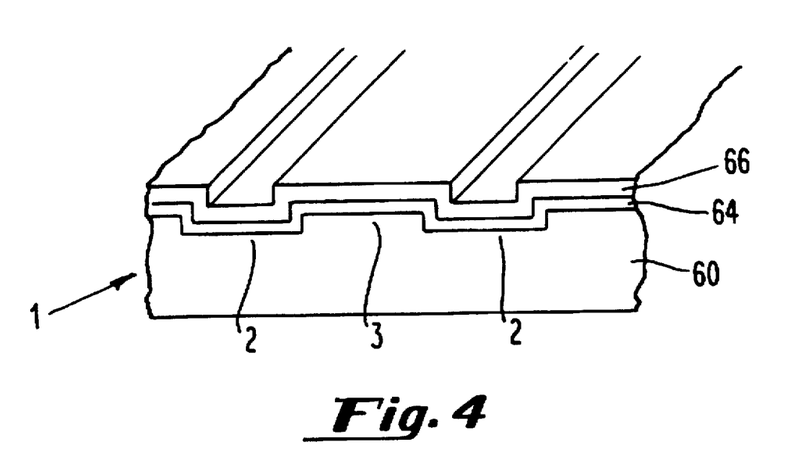
FIG. 4 is a cross sectional view of a magnetooptical disk medium.
Figure 11:
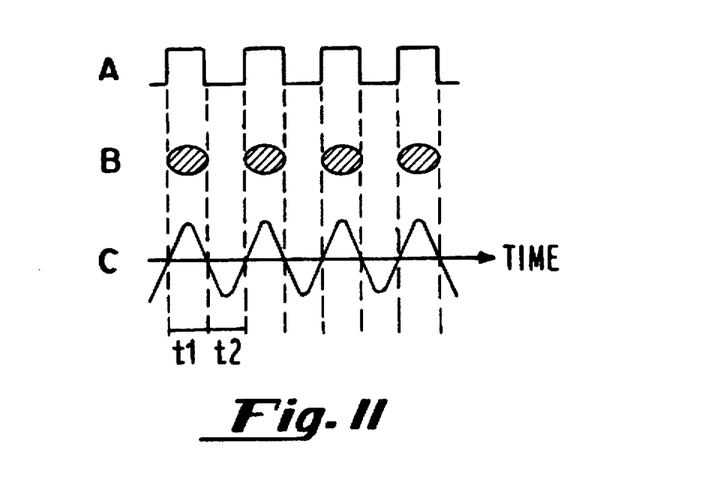
FIGS. 11A-C illustrates an original signal to be recorded, the generated mark on the optical disk, and a play back signal generated based upon the mark so that an appropriate laser strength is determined for reading the data.

In order to determine how an optimal laser strength is measured, referring to FIGS. 11A–C, in general, a predetermined recording data is recorded on a magnetoptical disk and the recorded data is read from the disk to compare to the predetermined data for determining the accuracy of the I/O operations. To further illustrate this accuracy measurement, a magnetoptical disk as described with respect to FIG. 4 is rotated at 2400 rpm, and a laser beam having a wave length of 780 nm is emitted through an objective lens having a numerical aperture of 0.55. The laser beam is emitted towards the magnetoptical disk to raise the temperature in a recording layer while the external magnetization is exerted to flip the axis of magnetization. Data of frequency f0 and a duty of 50% as shown in FIG. 11A is recorded as marks on the magnetoptical disk as shown in FIG. 11B. When the recorded marks are read by the optical pick-up unit, a signal as shown in FIG. 11C is generates. I/O parameters related to the laser generation are adjusted so as to make the duration of T1 substantially the same as that of T2. When T1 is substantially identical to T2, the recording laser power strength is defined to be optimal. In the alternative embodiment of the current invention, the optimal recording laser strength is defined to be the laser strength when the secondary frequency 2f0 is minimal against the fundamental frequency f0. The following table shows the optimal recording laser strength for the land and groove portions at two different recording sites as specified by the distance from the rotational center along the radius:

| Recording Track Portion | 30 mm Radius | 60 mm Radius |
| --- | --- | --- |
| Land | 5.7 mW | 9.2 mW |
| Groove | 5.2 mW | 8.5 mW |

As described above, the optimal laser strength differs from a central region to a peripheral region of the disk due to a different angular speed of the disk where the laser beam is emitted. Because of the different angular speed, the same laser strength generates a different amount of heat in the recording layer in these regions. By the similar measuring processes, the optimal laser strength for the erasing process as well as that for the reading process are determined. The relationship among these laser strengths for the I/O operations is that the erasing laser level is generally higher than the recording laser level, and the reading laser level is usually lower than the recording laser level as described in the Background section.

Figure 12:
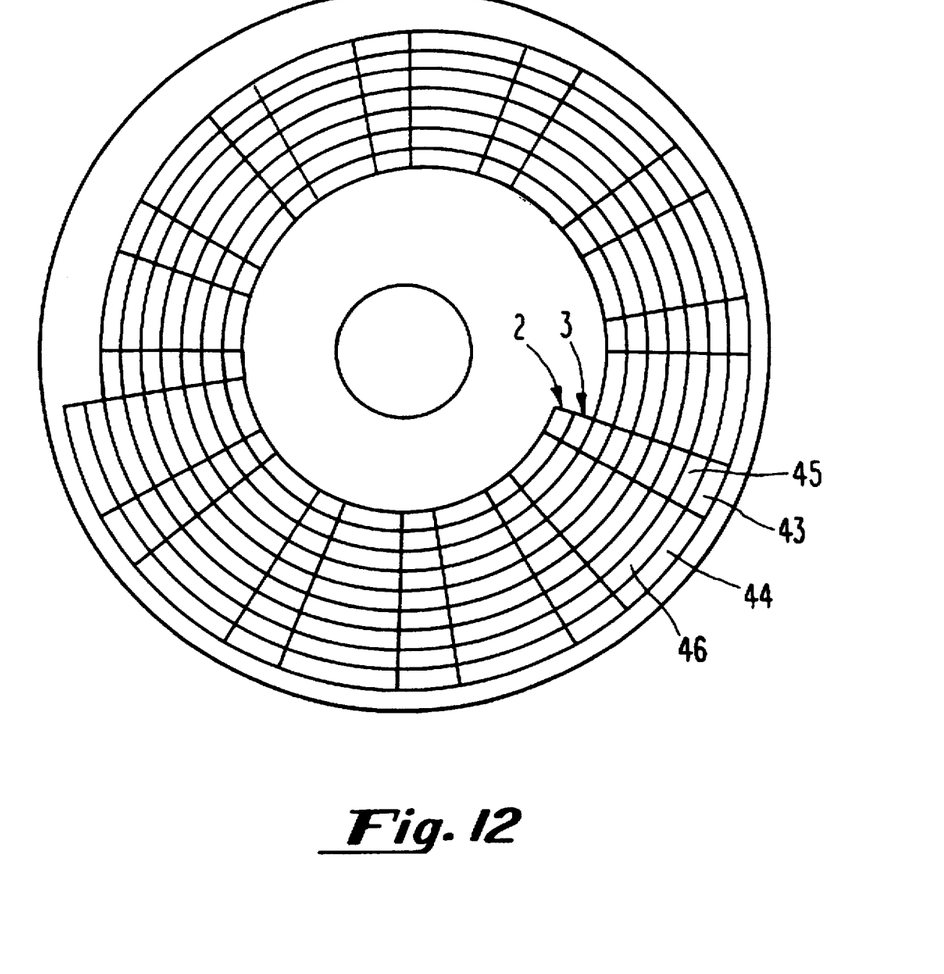
FIG. 12 illustrates one preferred embodiment of the magnetoptical disk having two spiral tracks each track segmented into a control information region and a data region according to the current invention.

Referring to FIG. 12, according to one preferred embodiment of the current invention, a magnetooptical disk is arranged into predetermined sectors for storing the above described optimal laser strength information rather than storing the laser power information in an external memory such as in the I/O system controller as shown in FIG. 5. In this simplified diagram, the adjacently located spiral tracks 2 and 3 are respectively the land portion and the groove portion. These tracks are divided into 12 sectors, and each sector contains an address portion such as portions 43 and 45 and a data portion such as portions 44 and 46. The above described laser strength information is stored at a predetermined location in the data portion according to this preferred embodiment. Such stored information is retrieved from the disk and used to adjust a certain I/O parameter prior to executing the corresponding I/O function for the specified track portion.

Figure 13A:
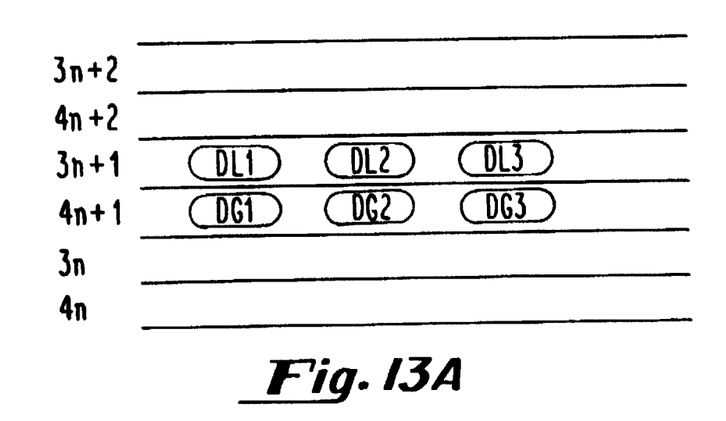
FIGS. 13A-B illustrate examples of the additional information for adjusting the laser strength according to the current invention.

Referring to FIGS. 13A and 13B, the above described disk arrangement for storing the laser strength information is shown in detail according to one preferred embodiment. In FIG. 13A, tracks designated as $3n$, $3n+1$ and $3n+2$ are control information tracks for the land portions. On the other hand, tracks designated as $4n$, $4n+1$ and $4n+2$ are control information tracks for the groove portions. In this regard, for example, on the track $3n+1$ contains three pieces of information labeled as DL1, DL2 and DL3 which respectively represent the recording, reading and erasing optimal laser power values for the land portion. On the track $4n+1$ contains three pieces of information labeled as DG1, DG2 and DG3 which respectively represent the recording, reading and erasing optimal laser power values for the groove portion.

Figure 13B:
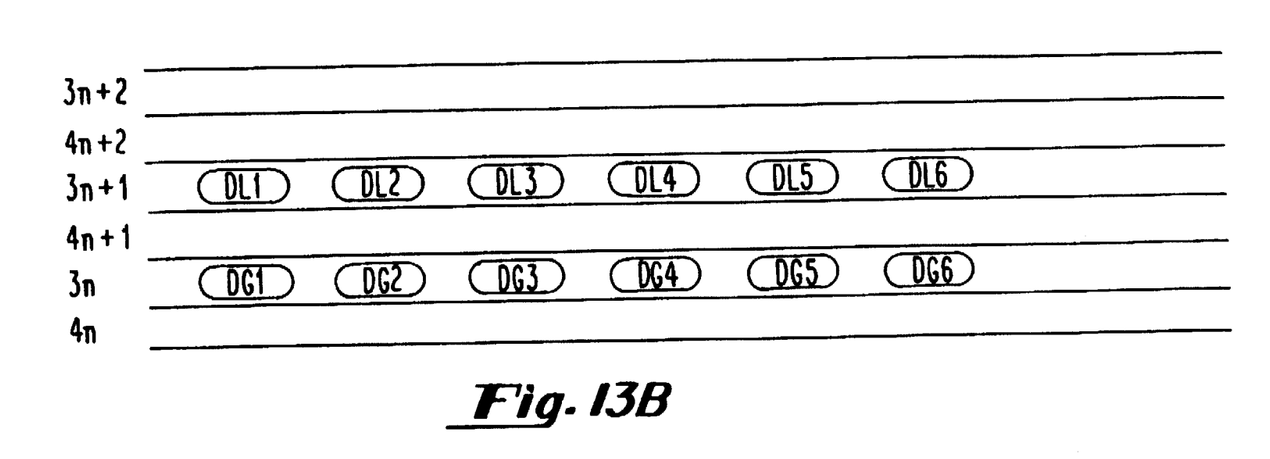

In contrast to using the adjacently located tracks for storing the laser power information as shown in FIG. 13A, the laser power information for the land and groove portions is respectively placed on tracks $3n+1$ and $3n$ as shown in FIG. 13B. When these laser power values are retrieved and the laser is accordingly adjusted prior to a specified operation, the I/O performance is maintained at a substantially high accuracy for both the land and groove portions. FIG. 13B also illustrates that a second set of laser power values according to another embodiment of the current invention. DL4, DL5 and DL6 as well as DG4, DG5 and DG6 respectively contain a second set of laser power values for recording, reading and erasing at another site or region which is located at a different distance from the rotational axis along the radius from those locations optimized by the first set of laser power values, DL1, DL2 and DL3 as well as DG1, DG2 and DG3. According to a third embodiment of the current invention, the distance is further divided so as to specify three regions on the disk. In this case, the total of 18 individual laser power values is stored.

Figure 14A:
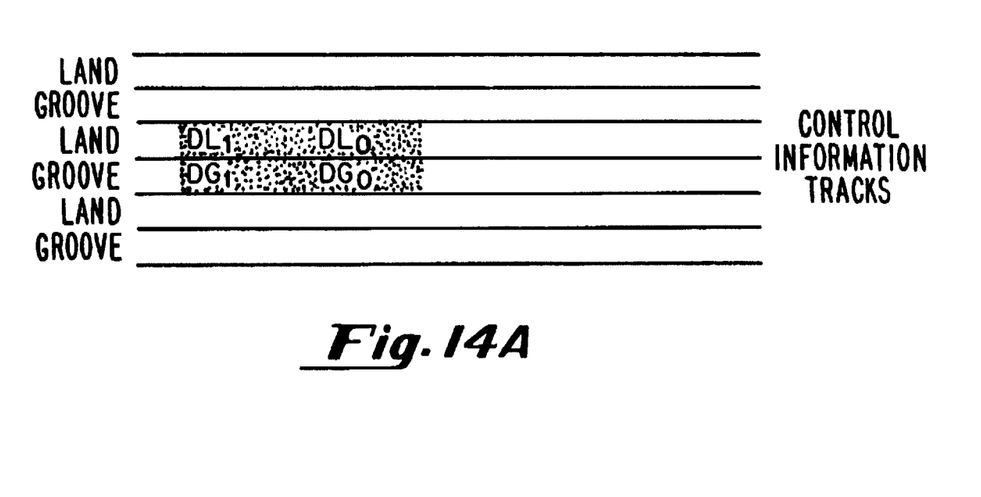
FIGS. 14A-B illustrate examples of the arrangements for storing the laser strength information according to the current invention.
Figure 14B:
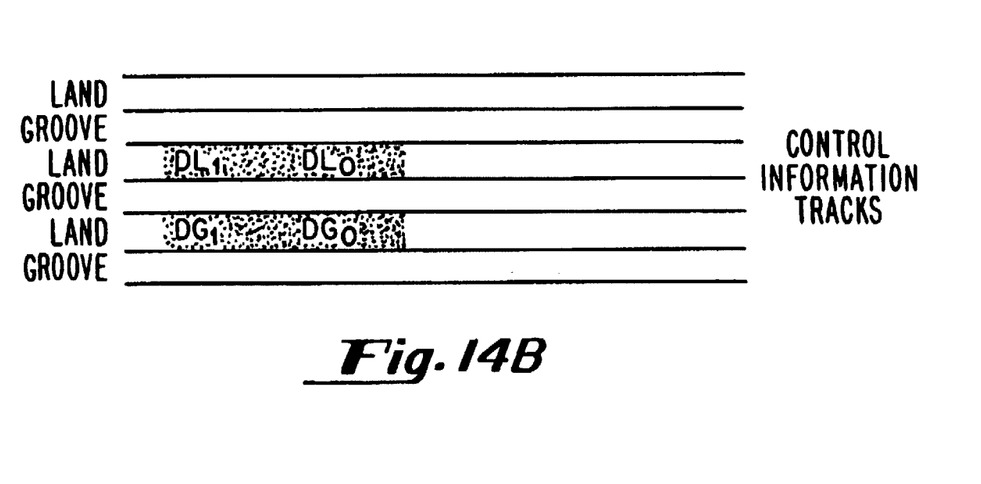

In addition to the above described laser power information, according to an another embodiment, other types of information are also helpful in optimizing the I/O performance. For example, such other information includes a track width, a mark width, a recording layer thickness and a certain optical coefficient of the recording layer. For example, the mark width determines an amount of heat necessary to accomplish a certain I/O function. This information is used to optimize the laser power strength or optimizing a wave form equalizer. Some or all of these information differ between the land portion and the groove portion. Some or all of these additional information also depend upon the location as to the distance from the rotational axis. According to FIGS. 14A and 14B, the above described information is stored on control information tracks of the magnetoptical disk. FIG. 14A illustrates that a land portion of the control information track contains the above described information for the land portions at two different sites in the disk. Similarly, FIG. 14A also illustrates that the groove portion contains two set of the additional information for the groove portions at two different locations on the disk. In contrast, FIGS. 14A and 14B show that the above described land and groove related information does not have to be stored in the corresponding track.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts, as well as implementation in software, hardware, or a combination of both within the principles of the invention to the full extent indicated by the broad general meaning of the terms in which the appended claims are expressed.

What is claimed is:

1. A method of fine-tuning the I/O operations involving an optical disk medium, comprising the steps of:
   a) storing information related to heat-characteristics of predetermined recordable Portions of the optical disk medium wherein said predetermined portions include a land portion and a groove portion of the optical disk medium;
   b) retrieving the information stored in said step a); and
   c) adjusting an operational parameter based upon the information retrieved in said step b) so as to substantially improve the I/O operations of said optical disk medium.

2. The method of fine-tuning the I/O operations according to claim 1 wherein said information includes a first set of adjustment values for said land portion and a second set of adjustment values for said groove portion.

3. The method of fine-tuning the I/O operations according to claim 2 wherein said land portion and said groove portion is each further defined into track groups based upon various predetermined distances from a rotational center of the optical disk medium.

4. The method of fine-tuning the I/O operations according to claim 3 wherein said information further includes additional sets of said adjustment values for said tracks groups.

5. The method of fine-tuning the I/O operations according to claim 1 wherein said information includes a first value used in the operational parameter for adjusting a laser strength prior to the data is being recorded on the optical disk medium.

6. The method of fine-tuning the I/O operations according to claim 1 wherein said information includes a second value-used in the operational parameter for adjusting a laser strength prior to the data is being read from the optical disk medium.

7. The method of fine-tuning the I/O operations according to claim 1 wherein said information includes a third value used in the operational parameter for adjusting a laser strength prior to the data is being erased from the optical disk medium.

8. The method of fine-tuning the I/O operations according to claim 1 wherein said information includes a fourth value used in the operational parameter for adjusting the filtering characteristics of a wave form equalizer after the data is being read from the optical disk medium.

9. The method of fine-tuning the I/O operations according to claim 1 wherein said step a) is performed by writing said information on the optical disk medium.

10. The method of fine-tuning the I/O operations according to claim 1 wherein said step a) is performed by writing said information on a storage other than the optical disk medium.

11. The method of fine-tuning the I/O operations according to claim 1 wherein said step a) includes an additional step of recording data on said predetermined portions of the optical disk medium.

12. A method of adjusting input-output (I/O) operations involving an optical disk having a land portion and a groove portion, comprising the steps of:

a) storing separate heat-characteristic information for the groove portion and the land portion in combination with each of the I/O operations on the optical disk;

b) determining a portion is whether the land portion or the groove portion;

c) selecting a combination of the portion and one of the I/O operations;

d) retrieving the information stored in said step a) which corresponds to said combination selected in said step c); and e) adjusting an operational parameter based upon the information retrieved in said step d) so as to substantially optimize said selected I/O operation involving said selected portion of said magnetoptical disk.

13. An optical disk, comprising:

recordable data portions for storing data, said data portions having sub-regions each of which has a substantially distinct heat characteristics; and information storage portions each associated with a corresponding one of said sub-regions for storing separate heat characteristic information.

14. The optical disk according to claim 13 wherein said recordable data portions include a groove portion and a land portion.

15. The optical disk according to claim 14 wherein said information storage portions include a groove portion and a land portion.

16. The optical disk according to claim 13 wherein each of said information storage portions is located adjacent to the corresponding one of said recordable data portions.

17. The optical disk according to claim 13 wherein said information storage portions are located contiguously and form a single table.

18. The optical disk according to claim 14 wherein said land portion and said groove portion are each further divided into track portions based upon a distance from a rotational center of the optical disk.

19. The optical disk according to claim 18 wherein said information storage portions contain separate heat characteristics information for each of said track portions.

20. The magnetoptical disk according to claim 18 wherein said heat characteristics information includes laser beam adjustment values used for recording, reading and erasing data on said recordable portions.

21. An optical disk, comprising:

a land portion having a first heat characteristics for storing data;

a groove portion located adjacent to said land portion having a second heat characteristics for storing data; and wherein a first table of adjustment values for compensating said first heat characteristics is stored on said land portion while a second table of adjustment values for compensating said second heat characteristics is stored on said groove portion.

22. A system for adjusting an input-output (I/O) operational parameter for an optical recording device, comprising:

an optical disk medium having predetermined recordable portions including a land portion and a groove portion each having different heat characteristics;

an adjustable laser source unit for emitting laser which ultimately reaches the optical disk medium;

a determining unit for determining which one of the predetermined recordable portions is a specified portion for an I/O operation; and an I/O controller unit connected to said determining unit and said adjustable laser source unit for modifying the I/O parameter which specifies the strength of the laser according to the heat characteristics of the specified portion.

23. The system for adjusting an I/O operational parameter according to claim 22 further comprising:

an information storing unit for storing information related to the heat-characteristics of the predetermined portions.

24. The system for fine-tuning the I/O operations according to claim 23 wherein said information includes separate heat characteristics of said land portion and said groove portion.

25. The system for fine-tuning the I/O operations according to claim 23 wherein said land portion and said groove portion are each further defined into track groups based upon various predetermined distances from a rotational center of the optical disk medium.

26. The system for fine-tuning the I/O operations according to claim 25 wherein said information further includes additional sets of heat characteristics for said tracks groups.

27. The system for fine-tuning the I/O operations according to claim 22 further comprising:

a memory for storing information on the heat characteristics of said predetermined recordable portions, said I/O controller unit connected to said additional memory for accessing the heat characteristics information.

28. The system for fine-tuning the I/O operations according to claim 22 wherein said I/O controller unit adjusts the laser strength prior to the data is being written on said optical disk medium.

29. The system for fine-tuning the I/O operations according to claim 22 wherein said I/O controller unit adjusts the laser strength prior to the data is being read from said optical disk medium.

30. The system for fine-tuning the I/O operations according to claim 22 wherein said I/O controller unit adjusts the laser strength prior to the data is being erased from said optical disk medium.

31. The system for fine-tuning the I/O operations according to claim 22 further comprising a wave form equalizer for processing the laser reflected off said optical disk medium wherein said I/O controller adjusts a filtering characteristics of a wave form equalizer while the data is being read from the optical disk medium.

32. A system for adjusting an input-output (I/O) operational parameter for an optical recording device, comprising:

an optical disk having predetermined portions including a land portion and a groove portion for recording data, said land portion having a first heat characteristic, said groove portion having a second heat characteristics, separate information for compensating said first heat characteristics and said second heat characteristics in combination with each of the I/O operations being stored in the optical disk;

an I/O device for performing a selected I/O operation on a selected portion, said I/O device having an input including an operational parameter;

a determining unit for determining whether a current portion for said selected I/O operation is said land portion or said groove portion; and an I/O controller unit connected to said determining unit and said I/O device for modifying said operational parameter based upon said separate information determined by said determining unit so as to substantially optimize said selected I/O operatoin on said selected portion of said optical disk.

33. A method of fine-tuning the I/O operations involving an optical disk medium, comprising the steps of:

a) storing a first set of adjustment values indicative of first information related to an amplitude of a first reproduction signal for said land portion and a second set of adjustment values indicative of second information related to an amplitude of a second reproduction signal for said groove portion of said optical disk;

b) retrieving said first information and said second information stored in said step a); and c) adjusting an operational parameter based upon said first information and said second information retrieved in said step b) so as to substantially improve the I/O operations for said optical disk medium.

34. An optical disk, comprising:

a land portion having a first heat characteristics for storing data;

a groove portion having a second heat characteristics for storing data; and wherein a first table of adjustment values related to an amplitude of a reproduction signal of said land portion is stored on said land portion and a second table of adjustment values related to an amplitude of a reproduction signal of said groove portion is stored on said groove portion.

35. An optical disk, comprising:

a land portion having first heat characteristics for storing data;

a groove portion having second heat characteristics for storing data; and wherein a first table of adjustment values related to an amplitude of a reproduction signal of said land portion and a second table of adjustment values related to an amplitude of a reproduction signal of said groove portion are both stored on said land portion.

36. An optical disk, comprising:

a land portion having first heat characteristics for storing data;

a groove portion having second heat characteristics for storing data; and wherein a first table of adjustment values related to an amplitude of a reproduction signal of said land portion and a second table of adjustment values related to an amplitude of a reproduction signal of said groove portion are both stored on said groove portion.

37. The system for adjusting an I/O operational parameter according to claim 22 wherein said heat characteristics of said land portion and said groove portion are separate and varies according to a distance from a rotational center of the optical disk.

38. The system for adjusting an I/O operational parameter according to claim 23 wherein said information related to heat characteristics is stored on said optical disk.

39. An optical disk, comprising:

recordable data portions for storing data, said recordable data portions including a land portion and a groove portion each of which has a substantially distinct heat characteristics; and information storage portions containing information related to said heat characteristics.

40. The optical disk according to claim 39 wherein said information is related to laser beam adjustment values used for at least one of recording, reading and erasing.

41. The optical disk according to claim 40 wherein said laser beam adjustment values are according to a distance from a rotational center of the optical disk.

42. The optical disk according to claim 41 wherein said information storage portion are located on said land portion.

43. The optical disk according to claim 41 wherein said information storage portion are located on said groove portion.

44. The systems for fine-tuning the I/O operations according to claim 22 further comprising:

a selecting unit for selecting information which includes the heat characteristics of said land portion.

45. The systems for fine-tuning the I/O operations according to claim 22 further comprising:

a selecting unit for selecting information which includes the heat characteristics of said groove portion.

* * * * *